United States Patent

[11] 3,604,790

| [72] | Inventors | Edwin H. Land<br>Cambridge;<br>Rogers B. Downey, Lexington, both of, Mass. |
|---|---|---|
| [21] | Appl. No. | 792,733 |
| [22] | Filed | Jan. 21, 1969 |
| [45] | Patented | Sept. 14, 1971 |
| [73] | Assignee | Polaroid Corporation<br>Cambridge, Mass. |

[54] MULTIPURPOSE CASSETTE INCLUDING SOUND RECORDING AND PLAYBACK STATION
15 Claims, 7 Drawing Figs.

[52] U.S. Cl. ..................................................... 352/29,
242/199, 352/78, 352/130
[51] Int. Cl. ........................................................G03b 31/02,
G03b 23/02, G03d 5/00
[50] Field of Search........................................... 352/26–30,
72–78, 130; 242/199–200; 95/14, 15, 90.5

[56] References Cited
UNITED STATES PATENTS

| 2,216,909 | 10/1940 | Foster | 352/75 |
| 2,676,023 | 4/1954 | Isom | 352/29 X |
| 3,281,199 | 10/1966 | Kingston | 352/27 X |
| 3,300,270 | 1/1967 | Finnerty | 352/72 X |
| 3,383,998 | 5/1968 | Takats | 95/90.5 |
| 3,442,580 | 5/1969 | Winkler | 352/72 X |

Primary Examiner—Louis R. Prince
Assistant Examiner—Joseph W. Roskos
Attorneys—Brown and Mikulka, William D. Roberson and Robert L. Berger ABSTRACT: A motion-picture-film-handling cassette, adapted to be mounted in a camera for exposure operations and in a projector for projection operations, which includes a sound recording and playback station. The filmstrip contains a soundtrack and is advanced from an initial position within a light-sealed section of the cassette through an exposure station and the sound recording and playback station and then back into the light-sealed section. The sound-recording station is adapted to receive a sound transducer of the projector into operative relationship to the filmstrip. Intermediate of the film exposure station and the sound recording and playback station, a sprocket, adapted to be driven in unison with the claw mechanism of the projector, engages the filmstrip. Immediately prior to coming into operative relationship with the sound recording and pickup head, the filmstrip is gripped between the idler of the cassette and a capstan, the latter element having a flywheel attached thereto and forming part of the projector so as to extend into the cassette.

FIG. 1

INVENTORS
EDWIN H. LAND
and
ROGERS B. DOWNEY
BY Brown and Mikulka
and
Robert L. Berger
ATTORNEYS

INVENTORS
EDWIN H. LAND
and
ROGERS B. DOWNEY
BY Brown and Mikulka
and
Robert L. Berger
ATTORNEYS

MULTIPURPOSE CASSETTE INCLUDING SOUND RECORDING AND PLAYBACK STATION

A spring-biased idler engages the section of film strip disposed between the sprocket and the capstan. Sound recording can also be effected when the cassette is mounted in a special camera. In an alternate arrangement, the capstan assembly is entirely mounted within the cassette.

BACKGROUND OF THE INVENTION

1. Field of Invention

This invention relates to motion picture photography and, more particularly, to an improved multipurpose film-handling cassette in which sound information can be alternately recorded on a filmstrip and extracted therefrom.

2. Description of the Prior Art

Certain important improvements involving film-handling cassettes have been made in recent years to simplify the job of home motion picture photography. For example, cassettes are now available which are adapted to be quickly mounted as a unit into a camera for exposure purposes. After the film has been exposed, the cassette can be quickly removed from the camera and mailed to a processing laboratory.

Also, specially designed projectors are being marketed which accept quick-mounting cassettes containing the developed film. These systems not only greatly simplify the projection operation, but also provide a permanent storage container for the film, i.e., a cassette from which it is never necessary to withdraw the film for projection purposes.

However, neither of these significant improvements eliminate the major inconvenience associated with home motion picture photography, i.e., the extended time delay associated with the processing of the exposed film. Additionally, while camera cassettes simplify the procedures for loading film into and removing film from a camera, they do not simplify the multistep laboratory development process which require repackaging of the film for projection purposes.

Most recently important technological advances have made it possible for the home photographer interested in motion pictures to avoid the extensive waiting period previously associated with the processing of the exposed film in order that he might enjoy the fruits of his efforts in a matter of seconds. These advances are directed to the use of the one-step photographic process employing diffusion transfer techniques, in combination with compact multipurpose motion-picture-film-handling cassettes from which the film strip need never be removed during exposure, processing, projection and editing operations. Exemplary of such new and unique systems are those described in copending applications Ser. No. 755,901 of Edwin H. Land filed Aug. 28, 1968; Ser. No. 761,771 of Rogers B. Downey filed Sept. 23, 1968; Ser. No. 776,481 of Rogers B. Downey filed Nov. 18, 1968 and Ser. No. 772,789 of Vaito K. Eloranta and Benjamin C. Ruggles filed Nov. 1, 1968, all of which applications are assigned to the assignee of the present invention. However, none of these advantageous systems provides means for recording sound information on a film soundtrack or for extracting such information therefrom.

With respect to sound motion picture film arrangements, a system is currently offered in which the filmstrip is transported on conventional reels within a camera and within a projector during the exposure and projection operations, respectively. Sound information is recorded on a magnetic tape in a separate recording device, which device may utilize a cassette in which the magnetic tape is packaged. In this system the film alone is returned to a laboratory for processing. In another commercially available system, sound is recorded on a separate magnetic tape as the film is exposed in a conventional manner. Here both the magnetic tape and exposed filmstrip are returned to a processing laboratory where the film is developed, provided with an optical soundtrack corresponding to that on the magnetic tape and packaged in a cassette for subsequent use in a specially configured projector. One manufacturer currently markets an unexposed filmstrip provided with a magnetic soundtrack on which sound information can be recorded. This film is exposed and sound recorded thereon in a specially devised camera utilizing conventional reels.

Until now, the motion picture arts have lacked a compact multipurpose cassette capable of use in both a camera and a projector and which facilitates exposure, sound recording and playback, processing, projection and editing operations.

It is therefore a primary object of this invention to provide a multipurpose compact film-handling cassette in which a strip of motion picture film is permanently retained and in which sound information may be first recorded on the filmstrip and subsequently extracted therefrom.

A further object of this invention is to provide a compact multipurpose motion-picture-film-handling cassette in which the filmstrip can be progressively brought into operative relationship with a sound recording and pickup device at a uniform rate of speed.

Another object of this invention is to provide a compact multipurpose cassette in which a strip of motion picture film is permanently retained, in which the film can be exposed and projected, and in which sound information can first be recorded on the film and subsequently extracted therefrom.

Another object of this invention is to provide a compact multipurpose film-handling cassette in which the strip of motion picture film is permanently retained and in which the film can be exposed, processed and projected and in which sound information can first be recorded on the film and subsequently extracted therefrom.

An additional object of this invention is to provide a compact multipurpose motion-picture-film-handling cassette which can be mounted in a camera for exposure operations and mounted in a projection and sound recording and playback operations.

Still another object of this invention is to provide a compact multipurpose motion-picture-film-handling cassette in which a strip of film is permanently retained and in which an equivalent amount of the filmstrip is metered into operative relationship with a sound recording and sound pickup device as is transported in incremental steps for exposure or projection purposes by a mechanism external of the cassette.

Additionally, an object of this invention is to provide a compact multipurpose motion motion-picture-film-handling cassette adapted to be mounted in a camera for exposure operations and in a projector for projection operations and in which a substantially large inertia characteristic is imparted to the filmstrip immediately before it is brought into operative relationship with a sound recording and sound pickup device.

BRIEF DESCRIPTION OF THE DRAWINGS

The novel features that are considered characteristic of the invention are set forth with particularity in the appended claims. The invention itself however, both as to its organization and its method of operation together with additional objects and advantages thereof, will best be understood from the following description of the preferred embodiments when read in connection with the accompanying drawings wherein like numbers have been employed in the different figures to denote the same parts and wherein:

SUMMARY OF THE INVENTION

A preferred embodiment of this invention briefly comprises a unique compact multipurpose motion-picture-film-handling cassette in which the film is permanently retained during exposure, processing, sound recording, sound playback, projection and editing operations.

The housing of the cassette is provided with a light-sealed section and film exposure station and a sound recording and playback station located exteriorly thereof. The exposure station includes a film gate while the sound recording and pickup station is provided with an aperture adapted to receive an externally mounted sound recording and pickup device. A strip of unexposed motion picture film, having a section adapted to serve as a sound track, is initially coiled within the light-sealed section of the cassette, which section also includes means for advancing the film strip from its initial position through the film exposure station across the aforementioned film gate, through the sound recording and pickup station in operative relationship to the aforementioned sound recording and pickup device, and then back into the cassette's light-sealed section. Positioned to engage the filmstrip intermediate of the film gate and the sound recording and pickup device are a sprocket, a spring-biased idler and a second idler.

This cassette is adapted to be initially utilized in a motion picture camera for exposure purposes. Subsequently, the cassette may be removed from the camera and mounted in a projector which facilitates sound recording and playback operations as well as the processing of the film and the projection of images recorded thereon.

As the cassette containing the exposed filmstrip is mounted in the projector, its film-advancing means are engaged by the projector's drive means. The projector also includes a drive shaft which engages the sprocket of the cassette and which is connected to the claw mechanization of the projector so that the same amount of filmstrip is metered around the sprocket as is intermittently drawn across the projector's lens by its claw mechanism. A capstan, to which a flywheel is connected, is rotatably mounted in the projector so as to be received into the cassette adjacent the aforementioned second idler and which is further adapted to firmly press against the filmstrip as it passes around that idler. The projector also includes a sound recording and pickup head and an erase head adapted to enter the cassette's sound recording and pickup station through the aperture provided therein as the cassette is mounted on the projector, whereby these devices are positioned in operative relationship to the filmstrip. The cassette additionally includes a processing station adapted to be selectively activated when the cassette is mounted in the projector. Further, means are provided whereby, when the cassette is in the projector, the film strip disposed across its film gate is in operative relationship with the projector's projection system.

Thus, after the film has been exposed with the cassette mounted in a camera, it can be selectively processed and projected by then mounting in the projector, sound information can be selectively recorded on the filmstrip and then extracted therefrom during subsequent projection of the images recorded thereon.

The sprocket of the cassette, the cassette's spring-biased idler and the aforementioned second idler of the cassette, acting in conjunction with the capstan of the projector cooperate during the sound recording and playback operations to impart a uniform speed to that section of filmstrip passing in operative relationship to the sound-recording and pickup device.

If desired, the sound-recording operation may also be performed when the cassette is mounted in the camera. In such latter case, the camera is provided with a drive shaft that engages the sprocket of the cassette and which drive shaft is driven in unison with the claw mechanism of the camera. Also in this arrangement, the camera includes a capstan assembly, a sound recording device and a sound erase device similar to those previously mentioned as being part of the projector.

In an alternate embodiment of the cassette, the entire capstan assembly is mounted within the cassette itself.

Editing of the film can readily be accomplished by withdrawing a loop, including the section of interest, from the film gate of the cassette and removing sections thereof and/or adding sections thereto

DESCRIPTION OF THE PREFERRED EMBODIMENT

In typical silver transfer-reversal processes for black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. In order to form a positive print, this complex is transferred and reduced to silver on a silver-receptive stratum upon which the silver halide stratum has been superimposed. It has generally been the practice, in the completion of this process, to separate the silver-receptive and silver halide strata in order to render the positive print visible.

Typical film structures of this type as well as processing compositions for producing either fully developed full-color images or black-and-white images are shown in prior U.S. Pat. 2,726,154 of Edwin H. Land which issued on Dec. 6, 1955. Such a film structure may also be modified if desired to delete the chemical-carrying pods and the backing layer associated with the pods. A filmstrip constituted by the remaining structure may be processed after exposure by passing it through a reservoir of such chemicals, the viscosity of which may be adjusted by limiting the amount of viscous agent therein. The developed negative image-bearing emulsion can then be removed from the silver-receptive stratum by, for instance, a roll of stripping material. Aforementioned copending U.S. application Ser. No. 776,481 of Rogers B. Downey filed Nov. 18, 1968, describes a motion-picture-film-handling system employing a multipurpose compact cassette structure and in which a filmstrip of this modified type is processed.

It should be understood that such typical silver-transfer reversal film structures and processes may be utilized in the practice of the present invention. However, the currently preferred embodiment of this invention makes use of a film structure which also comprises both a photosensitive negative-image-containing emulsion and an image-receiving layer in which a visible image is formed by a diffusion transfer reversal process but which does not require the subsequent removal of the emulsion containing the negative image. This highly desirable feature is made possible by a developed negative image having a low covering power.

Since the developed negative image has a low covering power, the positive print may be rendered visible without separation of the silver halide and silver-receptive strata. For example, the silver-receptive stratum may be so constituted as to provide an unusually vigorous silver precipitating environment which causes the silver deposited upon it, in comparison with the silver developed in the silver halide stratum, to possess very high covering power, i.e., opacity for a given mass of reduced silver. If the silver halide is in such a concentration as to give rise only, when fully developed, to a predetermined low maximum density, and if the silver complex is reduced to silver in a vigorous silver-precipitatng environment, the resulting negative and positive prints in superposition provide a composite print which presents a good image for projection purposes as long as they are contained on a transparent support. Since the silver halide stratum and the silver-receptive stratum need not be separated, an overall simplification of the silver transfer-reversal process is achieved.

A composite film assembly of this preferred type as well as processing compositions for producing a fully developed black-and-white image without the necessity of subsequently removing the developed negative image after processing are shown in prior U.S. Pat. No. 2,861,885 of Edwin H. Land which issued on Nov. 25, 1958. Other composite film assemblies capable of producing fully developed full-color images without the necessity of removing the developed emulsion are shown in prior U.S. Pats. of Edwin H. Land No. 2,726,154 issued on Dec. 6, 1955 and No. 2,944,894 issued on July 12, 1960.

Reiterating, while the currently preferred embodiments of this invention illustrated in the drawings employ a particular type of film structure and processing technique, other film structures and processing techniques are also applicable for use therewith, the present invention not being directed to the chemistry or the particular manner by which a visible image is formed.

Figure 1:
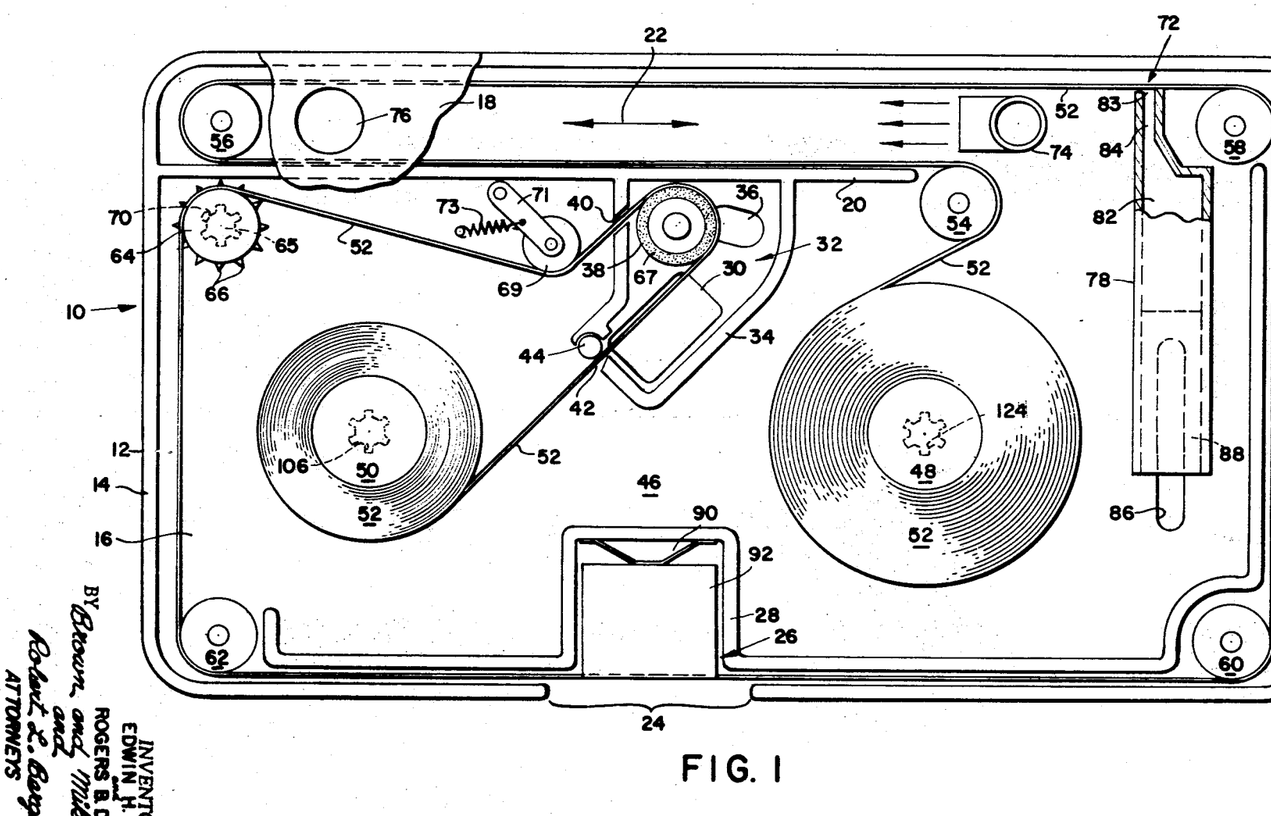
FIG. 1 is a diagrammatic front elevation view, partially in section, of a compact multipurpose motion-picture-film-handling cassette embodying features of this invention.

This invention can best be understood by first referring to FIG. 1 of the drawings which shows a motion picture film cassette 10 that can be utilized in exposing, processing, projection, sound recording, sound playback and editing operations. The housing 12 of the cassette 10 is in effect formed of a frame member 14 and a pair of cover plates 16 and 18. A baffle plate 20 defines, in conjunction with adjacent sections of the frame member 14 and cover plates 16 and 18, a drying chamber 22. Provided in the frame member 14 is a film gate 24 that forms part of an exposure station 26, which exposure station is separated from the other interior sections of the cassette 10 by a lighttight baffle member 28. An aperture 30 provided in the cassette's cover plate 16 communicates with a sound recording and playback station 32 defined by an interior lighttight wall 34 and the adjacent sections of the cover plates 16 and 18 and the baffle plate 20. Also the cover plate 16 is provided with a second aperture 36, and an idler 38 is located in close proximity thereto within the sound recording and playback station 32. Extending through the wall 34 are a pair of channels 40 and 42, and an idler 44 is rotatably mounted within the wall 34 adjacent the channel 42. The purpose of these channels 40 and 42 and of the idler 44 will subsequently become apparent.

Figure 5:
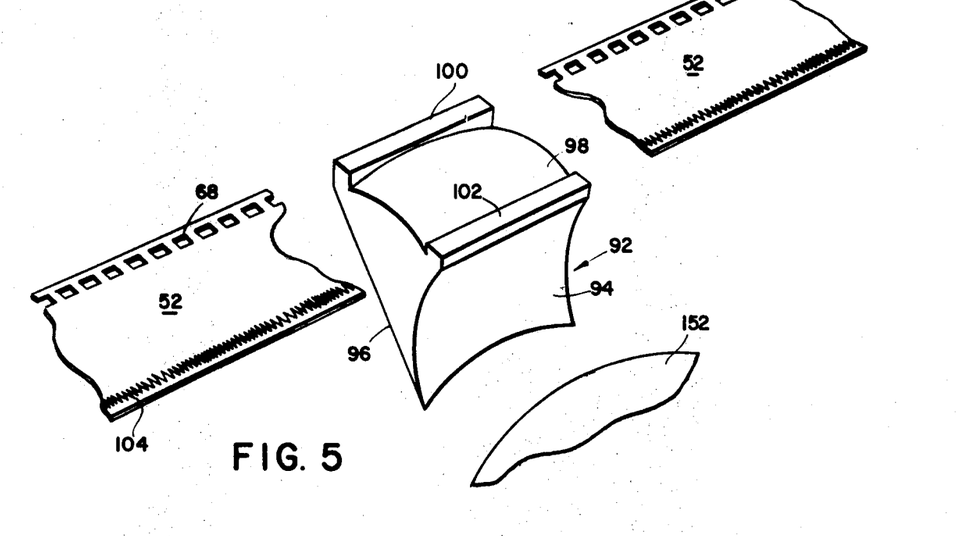
FIG. 5 is a diagrammatic perspective view, partially in section, illustrating the light-reflecting element and filmstrip employed in the cassette illustrated in FIG. 1.

It will be noted that the lighttight baffle member 28 and the interior lighttight wall 34 separate the exposure station 26 and the sound recording and playback station 32, respectively, from a light-sealed section 46 of the cassette 10. Rotatably mounted within this lighttight section 46 are a supply reel 48 and a takeup reel 50. Respective ends of a strip of motion picture film 52 are attached to these reels 48 and 50. In traveling from the supply reel 48 to the takeup reel 50, the strip of film 52 passes sequentially around idlers 54, 56, 58, 60, 62, 64, 38 and 44. In this respect it will be noted that the idler 64 is adapted to serve as a sprocket being provided with teeth 66 which engage sprocket holes 68 (See FIG. 5) of the film strip 52 and with a grooved recess 70 adapted to receive an appropriately splined drive shaft. Also, it is pointed out that the peripheral surface 67 of the idler 38 is preferably formed of a high traction material such as rubber.

In passing between idlers 60 and 62 the filmstrip 52 traverses the exposure station 26 behind the film gate 24 and then reenters the cassette's light-sealed section 46. After passing idler or sprocket 64, the filmstrip enters the sound recording and playback station 32 through the channel 40, crosses over the aperture 30 in passing around the idler 38 and reenters the light-sealed section of the cassette through channel 42. Intermediate of the sprocket 64 and the idler 38, the filmstrip 52 is engaged by another idler 69 mounted at one end of an arm 71 which has its other end pivotally connected to the cover plate 16. A spring 73, extending between the cover plate 16 and the arm 71 serves to continually urge this idler 69 against the filmstrip 52.

In passing between idlers 54 and 58, the filmstrip 52 makes a double pass through the aforementioned drying chamber 22 and then passes through a processing station 72. In connection with the drying chamber 22, the cover plate 16 receives a baffled orifice 74 adapted to be connected to an external air duct, while the cover plate 18 is provided with an outlet port 76.

With respect to the processing station 72, an applicator 78 contains a viscous development composition 82 suitable for processing the film strip 52 after it has been exposed to produce visible images thereon. The interior of the applicator 78 communicates with a doctor blade 83 through an orifice 84.

Extending along the cover plate 16 adjacent the applicator 78 is an elongated slot 86. This slot 86 is adapted to receive the end of an externally mounted rod which may be caused to bear against a plunger 88 mounted internally of the applicator 78. In this manner, movement of the plunger 88 inwardly of the applicator 78 under the force of such a rod will cause development composition to be expressed through the orifice 84 and the doctor blade 83 onto the filmstrip 52 as it passes through the processing station 72.

The cover plate 16 and the lighttight baffle member 28 are configured to provide a recess 90 within the cassette housing 12 in which a light reflecting element 92 is permanently mounted by any suitable means. In the system illustrated in the drawings, this light reflecting element is prismatic in nature (see FIG. 5) and includes a concave light receiving transparent face 94 and a flat reflecting surface 96 which reflects light received into the element through the concave face outwardly through a convex transparent face 98 onto that portion of the filmstrip 52 disposed across the film gate 24. The light-reflecting element 92 also includes a pair of parallel bearing surfaces 100 and 102 disposed on opposite sides of its convex transparent face 98 and on which the filmstrip 52 is supported as it traverses the film gate 24. A prismatic element of this type suitable for use in connection with the present invention is described in copending application Ser. No. 767,609 of Herbert A Bing filed Oct. 15, 1968, and assigned to the assignee of the present invention. As may be seen in this FIG. 5 of the drawings, the filmstrip 52 includes a magnetic soundtrack 104 provided in the vicinity of one edge thereof and which is adapted to have sound information first recorded thereon and then subsequently extracted therefrom.

Cassette 10 is initially furnished with substantially all of the film strip 52 coiled on the supply reel 48 in a photosensitive condition. For exposure purposes, the cassette 10 is mounted in an appropriate camera (not shown) with the drive means of the camera engaging a recess 106 of the takeup reel 50. In this use, light rays from the scene being photographed are focused by the camera lens through the camera shutter and the film gate 24 onto the photosensitive filmstrip 52 in its passage from the supply reel 48 to the takeup reel 50. During this exposure sequence, the film-drying chamber 22, the processing station 72 and the sound recording and playback station 32 remain inoperative. As the filmstrip 52 is drawn onto the takeup reel 50 by power supplied thereto by the camera, it is simultaneously advanced past the film gate 24 in incremental steps by a typical claw mechanism or the like of the camera cooperating with the sprocket holes 68 appropriately provided in the filmstrip 52. In the embodiment illustrated, the photosensitive surface of the filmstrip 52 faces inwardly of the housing 12 such that exposure of the emulsion is effected through the transparent film base. It will be noted that the soundtrack 104 is provided along an edge of the filmstrip 52 on the opposite side thereof from its photosensitive surface (see FIG. 5).

Idler 60, around which the film strip 52 passes on its way to the film gate 24 from the supply reel 48, may, if desired, be mounted on a movable post spring biased toward the corner which it occupies of the cassette housing 12 and capable of movement resiliently inwardly away from that corner. Preferably,, the idler 62 is mounted within the cassette 10 to provide a snubbing action whenever the filmstrip is being transported from the supply reel 48 to the takeup reel 50 and the member 64 is not being driven by an externally mounted drive shaft. In other situations, the preferred mounting arrangement of the idler 62 allows for free rotation about its axis in either direction and also so as to resiliently permit a small amount of displacement inwardly of the cassette away from the corner it occupies therein. These arrangements represent one way of minimizing strain on the filmstrip by the intermittent film advancement mechanism.

Figure 2:
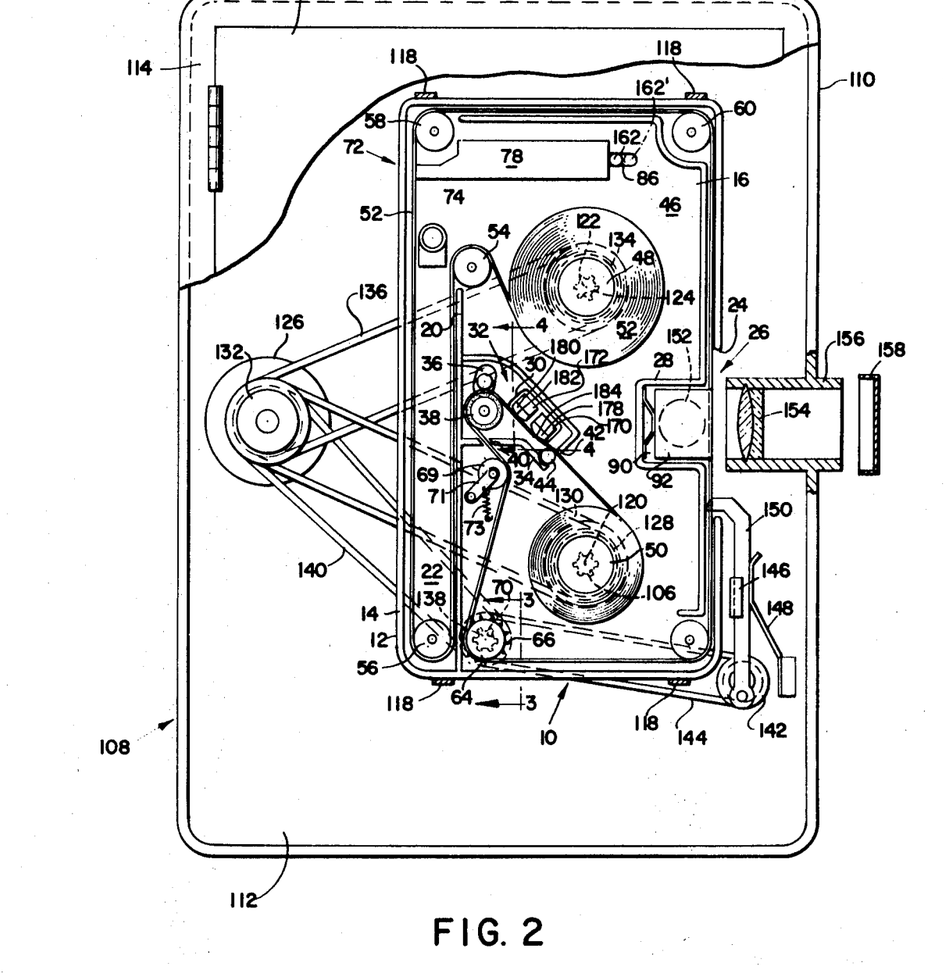
FIG. 2 is a diagrammatic front elevation view, partially in section, of the cassette illustrated in FIG. 1 mounted in a projector.

While the exposed film strip 52 may be processed with the cassette 10 mounted in the camera or, when it is mounted in a special processing apparatus, it is preferably processed while the cassette is mounted in the special projector 108 diagrammatically illustrated in FIG. 2 of the drawings. Basically, the housing of this projector 108 consists of a frame member 110 enclosed by a rear panel 112 and a front panel 114. Hinged to, and forming part of, the front panel 114 is a door 116. The multipurpose compact cassette 10 is adapted to be received into the projector 108 through its door 116 and retained therein by spring clamps 118 extending from the projector's rear panel 112. When so mounted in the projector 108, drive shafts 120 and 122, rotatably mounted from the rear panel 112 respectively engage the recess 106 of the takeup reel 50 and a similar recess 124 of the supply reel 48. Drive shaft 120 may be connected to the projector's motor 126 through a slip clutch 128, a belt 130 and a multiple-clutching mechanism 132. In turn, the drive shaft 122 may be connected to the projector's motor 126 through a slip clutch 134, a belt 136 and the multiple-clutching mechanism 132. In this manner the projector's motor 126 can be alternately employed to drive the takeup reel 50 and the supply reel 48 to selectively effect reversible transport of the filmstrip 52 within the cassette housing 12 between the supply reel and the takeup reel.

Figure 3:
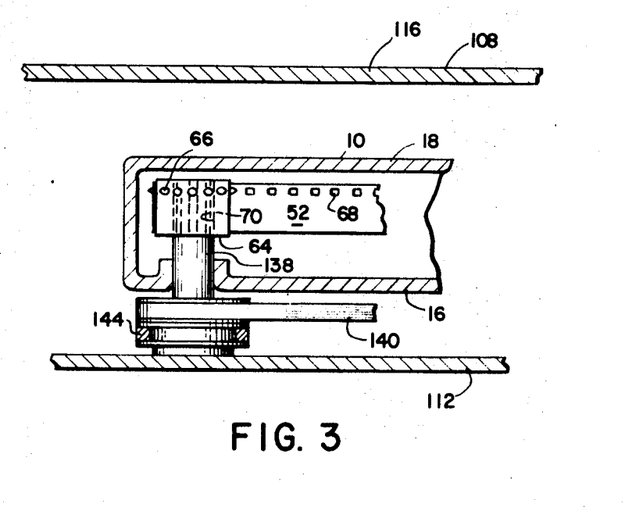
FIG. 3 is a view of the projector's mechanism for driving a sprocket of the cassette taken along line 3—3 of FIG. 2.

Also, when the cassette 10 is mounted in the projector 108, the recess 70 of the sprocket 64 receives the spline of another drive shaft 138 extending from the projector's rear panel 112 (see FIG. 3). This drive shaft 138 may be connected to the projector's motor 126 through a belt 140 and the multiple-clutching mechanism 132. It is also connected to a wheel 142 rotatably mounted from the projector's rear panel 112 by a belt 144. Supported within the projector between a guide post 146 and a spring 148 is a claw member 150, one end of which is eccentrically mounted to the wheel 142 and the other end of which is adapted to extend into the cassette 10 and engage the sprocket holes 68 of the filmstrip 52. As the wheel 142 is rotated about its axis, the claw member 152 engages the sprocket holes 68 to draw the filmstrip 52 in incremental steps across the film gate 24. The sprocket 64 serves to filter out the incremental motion imparted to the filmstrip 52 by the claw member 150 and to meter the filmstrip towards the cassette's sound recording and playback station 32 at a much more uniform rate of speed.

Still referring to FIG. 2, the projector 108 includes a light source 152 and lens 154, the latter of which elements is in registry with a flanged opening 156 provided in the frame member 110. Snugly seated on this flanged opening 156 is a dust cap 158. When the cassette 10 is mounted in the projector 108, the light-reflecting element 92 of the cassette 10 is positioned immediately in front of the light source 152 and also in alignment with the lens 154. Consequently, light entering the element 92 from the light source 152 is redirected by the flat reflecting surface 96 of that element outwardly of the cassette through the filmstrip 52 and the film gate 24 onto the lens 154. Thus, the cassette's station 26, defined in part by the opening or film gate 24 in the framing member 14 and which serves as an exposure station during film exposure operations, constitutes a projection station during film projection operations. In this manner, visible images recorded on the filmstrip 52 can be projected onto a screen (not shown) appropriately positioned in front of the flanged opening 156 as the film is drawn across the film gate 24 by the claw member 150.

The rear panel 112 of the projector 108 is provided with an elongate slot 160 (see FIG. 6) which is positioned adjacent the elongate slot 86 of the cassette 10 when the cassette is mounted in the projector. Passing through this slot 160 so as to enter the slot 86 of the cassette 10 is a pin 162. On the end of this pin 162 extending exteriorly of the projector's rear panel 112, there is provided a hand knob 164 which includes a reduced stem portion 166 adapted to seat in a recess 168 of the projector's rear panel, which recess communicates with the elongated slot 160. Conventional means (not shown) continually urge the pin 162 both inwardly of the projector 108 and in a right-hand direction along the slot 160 as viewed in FIG. 6 of the drawings. Thus, the reduced stem portion 166 of the hand knob 164 will seat in the recess 168 to lock the pin 162 in a fixed position with respect to the applicator 78. This locked position of the pin 162 is shown in phantom in FIG. 2. By withdrawing the hand knob 164 from the recess 168, the conventional means mentioned above urge the pin 162 against the plunger 88 to drive that member inwardly of the applicator 78 whereby viscous development composition 82 will be expressed from the applicator's doctor blade 83 onto the film strip 52 as the film strip passes through the processing station 72.

As shown in FIG. 2 the projector 108 also includes a magnetic sound recording and pickup head 170 and a magnetic erase head 172 which extend from the projector's rear panel 112 so as to enter the cassette's sound-recording and playback station 32 through the aperture 30. These devices are provided with appropriate conventional electronic amplifying and switching circuitry (not shown) contained within the projector 108 and through which the magnetic sound recording and pickup transducers of the head 170 are respectively connected to a microphone receptacle 174 and to a speaker receptacle 176 provided on the projector's rear panel 112 (see FIG. 6). Both the sound recording and pickup head 170 and the erase head 172 are provided with tapered portions 178 and 180, respectively, such that, as they enter the cassette 10, these tapered portions first engage the filmstrip 52 and gradually displace it from its initial position within the sound-recording and playback station 32 as shown in FIG. 1 toward the position within that station as shown in FIG. 2. Thus, after the cassette 10 has been mounted in the projector 108, the film strip 52 engages the transducer pole surfaces 182 and 184, respectively of the erase head 172 and recording and pickup head 170 and the filmstrip rides over idler 38 in leaving the sound-recording and playback station 32 through the channel 42. Selective operation of these sound devices 170 and 172 is effected by use of a control knob 185 located on the projector's rear panel 112 (see FIG. 6).

Figure 4:
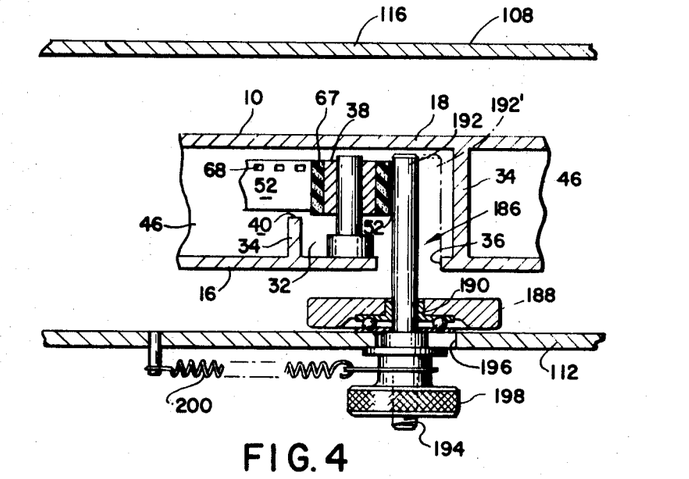
FIG. 4 is a view of the projector's capstan engaging the filmstrip within the cassette taken along line 4—4 of FIG. 2.

As may be seen in FIG. 4 of the drawings, the projector 108 includes a capstan assembly 186 extending from its rear panel 112 and comprising a flywheel 188 mounted on a shaft 190. One end of the shaft 190 serves as a capstan 192, which is adapted to enter the cassette's sound recording and playback station 32 through the aperture 30, and the other portion of which is journaled with respect to the projector's rear panel 112, extends through a slot 196 of the rear panel and then terminates in a threaded portion 194. The threaded portion 194 of the shaft 190 receives a hand nut 198, and a spring 200 connected to this hand nut continually urges the entire capstan assembly 186 along the slot 196 in a left-hand direction as viewed in FIG. 4. More importantly, this spring 200 continually urges the capstan 192 itself towards the filmstrip 52 as it passes around idler 38. It will be recognized that, after the cassette 10 has been mounted in the projector 108, the hand nut 198 can be manually operated to move the capstan 192 from an initial position (shown in phantom in FIG. 4) where it does not contact the filmstrip 52 into a position where it firmly presses the filmstrip against the idler 38. In this manner, as the filmstrip 52 passes through the sound-recording and playback station 32, the relatively high inertia of the flywheel 188 may be transmitted through the capstan 192 to the filmstrip immediately before the filmstrip comes into contact with the erase head 172 and the sound recording and pickup head 170. The relatively large diameter and rubber peripheral surfaces 67 of the idler 38 provides good traction between it and the filmstrip 52 as the filmstrip is drawn between that idler and the capstan 192.

As previously indicated, since the sprocket 64 is connected by the belt 144 to the wheel 142, the sprocket meters the same amount of filmstrip 52 towards the sound-recording and playback station 32 as is drawn in incremental steps across the film gate 24 by the projector's claw member 150. However, the teeth 66 of the sprocket 64 themselves impart a small nonuniform motion to the filmstrip 52. The inertia-imparting action of the capstan 192 on the filmstrip 52 effectively serves to filter out this small amount of inertia-imparting action of the capstan 192 on the filmstrip 52 effectively serves to filter out this small amount of intermittent motion. Simultaneously, the idler 69 under the force of the spring 73 presses against the filmstrip 52 intermediate of the sprocket 64 and the capstan 192 to continually maintain this section of the filmstrip taut, thereby accommodating for the difference between the small amount of nonuniform motion imparted by the action of the sprocket teeth 66 to the filmstrip and the filtering action of the capstan 192 on the filmstrip.

An air heating and blowing unit 202, mounted on the outside face of the projector's rear panel 112, is connected to a duct 204 which passes through the rear panel and which, when the cassette 10 is mounted in the projector 108, engages the cassette 10 is mounted in the projector 108, engages the cassette's baffle orifice 74. By energizing the air heating and blowing unit 202, warm air can be directed into the cassette's drying chamber 22 and exhausted therefrom through the port 76.

Toggle switches 206, 208 and 210 and the control knob 185, mounted on the outside face of the projector's rear panel 112 (see FIG. 6), control the operation of the described system in a manner to be set forth hereinafter.

OPERATION OF THE PREFERRED EMBODIMENT

To summarize the operation of the preferred embodiment of this invention, the cassette 10 with its film strip 52 in an unexposed condition and substantially entirely coiled on the supply reel 48 is adapted to be quick-mounted in a camera (not shown). The camera includes a drive shaft which engages the recess 106 of the takeup reel 50 and which can be selectively connected to the camera's motor to advance the filmstrip 52 from the supply reel 48 onto the takeup reel 50. During this process a claw mechanism of the camera engages the sprocket holes 68 of the filmstrip 52 through the film gate 24 to draw the filmstrip in incremental steps across the film gate for exposure purposes. In this manner, the operator can selectively record images on the photosensitive filmstrip 52 as it traverses the film gate 24. During the picture-taking operation, the filmstrip 52 is supported across the film gate 24 on the bearing surfaces 100 and 102 of the light-reflecting element 92. After the filmstrip 52 has been completely exposed, the cassette 10 can be quickly removed from the camera and replaced, when desired, by an identical cassette containing unexposed film.

After exposure, the cassette 10 is mounted in the spring clamps 118 of the projector 108. At this time, the position of the capstan assembly 186 along the slot 196 is such that the capstan 192 is out of contact with the film strip 52 disposed through the cassette's sound-recording and playback station 32. However, as the cassette 10 is mounted in the projector 108, the tapered portions 178 and 180 of the magnetic sound erase head 172 and magnetic sound recording and pickup head 170, respectively, engage the filmstrip 52 and displace it from its position within the sound recording and playback station 32 shown in FIG. 1 of the drawings into the position shown in FIG. 2, in which latter position it is in contact with the surfaces 182 and 180 of the erase head 172 and the recording and pickup head 170, respectively. Also, at the time the cassette 10 is mounted in the projector 108, the projector's hand knob 164 is seated in the recess 168 such that the pin 162 is out of contact with the applicator's plunger 88, i.e., in the position shown in phantom in FIG. 2. The projector's drive shafts 120, 122 and 138 are now engaged with the cassette's takeup reel 50, supply reel 48 and sprocket 64, respectively, and the projector's duct 204 is engaged with the cassette's baffled orifice 74.

The toggle switch 206, mounted on the exterior face of the projector's rear panel, may now be thrown into its "on" position to energize the air heating and blowing unit 202 thereby causing warm air to circulate through the cassette's drying chamber 22. At this point, the hand knob 164 should be withdrawn from the recess 168 and permitted to slide along the slot 160 until the pin 162 is seated against the applicator's plunger 88.

By then turning the toggle switch 208 to its "on" position, the motor 126 is energized and the slip clutch 134 and the multiple-clutching mechanism 132 of the motor are engaged to connect the supply reel 48 to the motor whereby the exposed filmstrip 52 is returned to the supply reel 48 from the takeup reel 50.

As the filmstrip returns to the supply reel 48, it passes first through the cassette's processing station 72 and then through its drying chamber 22. The means in the projector continually urging the hand knob 164 along the slot 160 exerts a force on the viscous development chemicals 82 within the applicator 78 through the pin 162 and the plunger 88 causing a metered amount of development composition to be expressed onto the filmstrip 52 passing in front of the applicator's doctor blade 83. The film strip 52 then makes a double pass through the drying station 22. It should be understood that during this phase of the operation of the film strip 52 is returned at a relatively fast rate of speed to the supply reel 48, i.e., at a rate of speed substantially greater than normally associated with exposure and projection operations. At this relatively fast rate of speed, the processing fluid 82 applied to the filmstrip 52 as it passes through the processing station 72 is not thoroughly dried before the filmstrip is coiled on the supply reel 48; however, its surface is hardened sufficiently to prevent adjacent turns of filmstrip coiled on the supply reel from sticking together. Conventional means automatically return the toggle switch 208 to its "off" position when the filmstrip 52 is substantially completely coiled on the supply reel 48. The operator should then return the toggle switch 206 to its "off" position to deenergize the air heating and blowing unit 202.

At this time, the operator should also render the processing station 72 inoperative by sliding the hand knob 164 along the elongated slot 160 until it seats in the recess 168. This operation withdraws the pin 162 from contact with the applicator's plunger 88. The dust cover 158 should then be removed from the projector's flanged opening 156 and a screen (not shown) appropriately positioned in front of the projector 108.

Processing of the exposed film strip now coiled on the supply reel 48 may be completed and the visible images developed thereon projected onto the aforementioned screen by first returning toggle switch 206 to its "on" position to energize the projector's heating and blowing unit 202 and, shortly thereafter, throwing the toggle switch 210 from its "off" position to its "on" position. This toggle switch 210 energizes both the projector's motor 126 and light source 152 and additionally engages the slip clutch 128 and the multiple-clutching mechanism 132 to connect the motor to both the takeup reel 50 and the sprocket 64. The filmstrip 52 is thus again returned from the supply reel 48 to the takeup reel 50 but at a conventional projection speed, passing first through the drying chamber 22 and then across the film gate 24. The processing fluid on the filmstrip 52 is thoroughly dried as it makes this slow double pass through the drying chamber 22 and the projector's claw member 150, being connected through the wheel 142 to the sprocket 64, draws the developed filmstrip in incremental steps across the film gate. Visible images recorded on the developed filmstrip 52 are thus projected onto the aforementioned screen by light emitting from the light source 152 and which is redirected by the light-reflecting element 92 through the filmstrip and projection lens 154. When the fully developed and now projected film strip 52 has again been coiled on the takeup reel 50, conventional means (not shown) automatically return the toggle switch 210 to its "off" position. The operator should deenergize the air heating and blowing unit 202 using the toggle switch 206. By once again throwing the toggle switch 208 to its "on" position, the developed film strip 52 may be returned to the supply reel 48 at a rapid rate.

A microphone (not shown) may now be connected to the projector 108 through the receptacle 174. For recording purposes, the hand nut 198 should be loosened to permit the capstan 192 to press firmly against the filmstrip 52 as it passes around the idler 38. The control knob 185 should be turned to its position which energizes the recording mode of the sound recording and pickup head 170 and the toggle switch 210 thrown to its "on" position. The operator can utilize the aforementioned microphone to record the desired sound information on the filmstrip's sound track 104 while viewing a second projection of the visible images recorded on the filmstrip 52. When desired, the control knob 185 can be positioned to energize the erase head 172 in conjunction with the proper operation of switches 208 and 210. After the recording operation has been completed, the filmstrip 52 should be returned to the supply reel 48 by use of the toggle switch 206.

During subsequent projection operations, the control knob 185 is first turned to its position which energizes the playback mode of the head 170, the capstan 192 brought into contact with the filmstrip 52 and a speaker (not shown) connected to the receptacle 176. The toggle switch 210 is then thrown into its "on" position.

Editing of the developed film strip 52 can easily be effected. It is only necessary to draw a loop of the filmstrip 52 from the film gate 24 and to remove sections therefrom or to splice sections thereinto as desired.

DESCRIPTION OF AN ALTERNATE EMBODIMENT

Figures 6, 7:
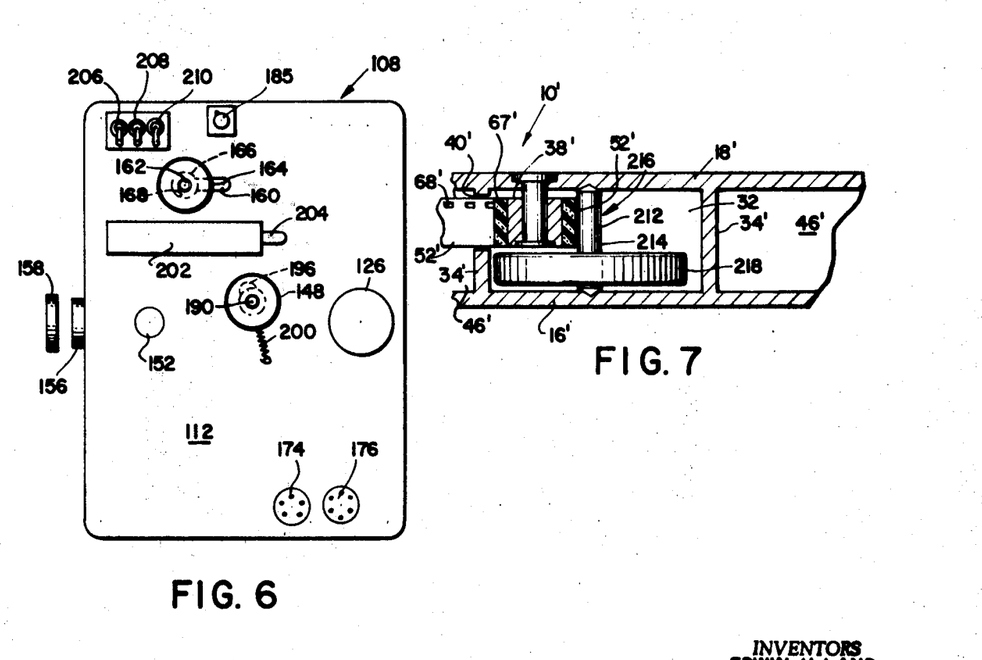
FIG. 6 is a diagrammatic rear elevation view of the projector illustrated in FIG. 2.
FIG. 7 is a partial side elevation view illustrating an alternate embodiment of the multipurpose motion-picture-film-handling cassette of this invention in which a capstan assembly is permanently retained internally of the cassette.

An alternate embodiment of this invention in which the entire capstan assembly is mounted internally of the cassette is illustrated in FIG. 7 of the drawings. The same numerals primed are employed in that figure to denote parts of that embodiment which remain substantially unchanged from the embodiment illustrated in the other figures of the drawings.

Referring now to FIG. 7, a cassette 10' includes a sound recording and playback station 32' in which an idler 38' is rotatably mounted. A film strip 52' enters the sound recording and playback station 32' from a light seal section 46' of the cassette 10' through a channel 40' provided in an interior lighttight wall 34'. As the filmstrip 52' passes around the idler 38' it is pressed firmly thereagainst by a capstan 212 which constitutes one section of a shaft 214 forming part of a capstan assembly 216. The ends of the shaft 214 are journaled to cover plates 16' and 18' and a flywheel 218 is mounted at an intermediate position of that shaft.

Those familiar with the motion picture arts will readily appreciate the novel and highly unique advantages of this system. A compact cassette is provided in which a film strip is permanently retained. The cassette is adapted to be mounted in a camera for exposure operations and in a projector for projection operations. Most importantly, this same multipurpose cassette facilitates the recording of high-quality sound information on the film strip and the subsequent playback of that sound information during projection operations.

The term "projector" is used herein in a comprehensive sense, i.e., to broadly refer to systems wherein a visible image recorded on a sheet of material is reimaged for viewing purposes and is not restricted to only those systems in which the recorded visible image is projected onto a screen of one type or another.

This invention may be practiced or embodied in still other ways without departing from the spirit or essential character thereof. For instance, while in the illustrated preferred embodiments, the processing and sound recording operations are performed with the cassette 10 or 10' mounted in the projector 108, one or both of these same operations may also be performed, if desired, when the cassette is mounted in a specially configured camera. In connection with the sound recording operation, the specially configured camera would include drive shafts engaging the sprocket 65 and the supply reel 48 as well as a sound-recording head and an erase head adapted to be received into the cassette's sound recording and playback station in operative relation to the filmstrip as it passes therethrough. For processing operations the specially configured camera would include a hand knob and pin assembly operable to activate a processing station of the cassette.

Also, the sound recording and playback station of the system may be optical in nature rather than magnetic. Further the light-reflecting element 92 may be permanently mounted in the projector 108 rather than forming a part of the cassette 10. This light-reflecting element 92 can also take the form of a mirror rather than being prismatic.

The preferred embodiments described herein are therefore illustrative and not restrictive, the scope of the invention being indicated by the appended claims and all variations which come within the meaning of the claims are intended to be embraced therein.

1. A film-handling cassette adapted to be removably mounted in a motion picture camera as well as in a motion picture projector comprising:
   an enclosed opaque housing having a light-sealed section formed as part thereof and at least one aperture;
   an unexposed photographic filmstrip coiled within said housing including a section adapted to serve as a soundtrack;
   a film exposure station within said housing external of said light-sealed section;
   a sound recording and playback station within said housing external of said light-sealed section, said aperture being positioned within said sound recording and playback station;
   first means for advancing said unexposed film strip within said housing from an initial position in said light-sealed section thereof through said exposure station and said sound recording and playback station and back into said light-sealed section, said aperture being adapted to receive at least a sound transducer in operative relationship to said sound track section of said filmstrip as said filmstrip is advanced through said sound recording and playback station;
   second means engaging said filmstrip as it is advanced within said housing to impart a uniform speed to that section of said soundtrack passing in operative relationship to said transducer when said transducer is received within said sound recording and playback station, whereby said unexposed filmstrip may be exposed and sound information first recorded on said filmstrip and subsequently extracted therefrom; and
   a normally inoperative film-processing station within said housing, intermediate the initial position of said coiled filmstrip and said sound recording and playback station, whereby said processing station may be activated to develop said filmstrip after said filmstrip has been exposed.

2. The cassette of claim 1 wherein said first means includes a supply reel to which one end of said film strip is affixed and a takeup reel to which the other end of said filmstrip is affixed, said reels being rotatably mounted within said light-sealed section of said housing on parallel axes and adapted to be driven by external drive means to transport said filmstrip reversibly between said reels, said photographic filmstrip being initially substantially entirely coiled around said supply reel in an unexposed condition and passing through said processing station, said exposure station and said sound recording and pickup station in reaching said takeup reel.

3. The cassette of claim 1 wherein said section of said filmstrip adapted to serve as a soundtrack and said transducer are of the magnetic type.

4. The cassette of claim 1 wherein said second means includes means for imparting a high inertia characteristic to said filmstrip prior to said soundtrack's passing in operative relationship to said transducer.

5. A film-handling cassette adapted to be alternately mounted in a motion picture camera and in a motion picture projector, said camera having drive means and means connected thereto for transporting filmstrip contained in said cassette in incremental steps in operative relationship to the lens of said camera when said cassette is mounted in said camera and said projector having drive means and means connected thereto for transporting filmstrip contained in said cassette in incremental steps in operative relationship to the lens of said projector when said cassette is mounted in said projector, comprising:

an enclosed opaque housing having a light-sealed section formed as part thereof and at least one aperture;

an unexposed photographic filmstrip coiled within said housing including a section adapted to serve as a sound track;

a film exposure station within said housing external of said light-sealed section;

a sound recording and playback station within said housing external of said light-sealed section, said aperture being positioned within said sound recording and playback station;

first means adapted to being alternately connected to said camera drive means and said projector drive means for advancing said unexposed filmstrip within said housing from an initial position in said light-sealed section thereof through said exposure station and said sound recording and playback station and back into said light-sealed section, said aperture being adapted to receive at least a sound transducer of said projector in operative relationship to said sound track section of said filmstrip when said cassette is mounted in said projector and as said filmstrip is advanced through said sound recording and playback station;

second means for imparting a uniform speed to that section of said soundtrack passing in operative relationship to said transducer within said sound recording and playback station, said second means including a sprocket rotatably mounted within said housing and engaging said filmstrip intermediate of the position where said filmstrip is engaged by said transporting means of said projector and said sound transducer when said cassette is mounted in said projector, said sprocket adapted to being driven by at least said projector drive means in unison with said film-transporting means of said projector, whereby the same length of said filmstrip is metered by said sprocket as said film-transporting means of said projecting transports in incremental steps in operative relationship to said projector lens, whereby said unexposed filmstrip may be exposed when said cassette is mounted in said camera and, when said cassette is mounted in said projector, sound information may be first recorded on said filmstrip and subsequently extracted therefrom; and a normally inoperative film-processing station within said housing, intermediate the initial position of said coiled filmstrip and said sound recording and playback station, whereby said processing station may be activated to develop said filmstrip after said filmstrip has been exposed.

6. The cassette of claim 5 wherein said second means additionally comprises an idler rotatably mounted within said housing and over which said filmstrip passes when advanced within said housing by said first means and a capstan assembly including a capstan and a flywheel, said capstan assembly being rotatably mounted within said housing with said capstan pressing firmly against said filmstrip as it passes over said idler, said idler and said capstan engaging said filmstrip intermediate of said sprocket and said transducer, whereby said idler and said capstan assembly filter out the nonuniform motion imparted to said filmstrip by the teeth of said sprocket.

7. The cassette of claim 6 wherein said second means additionally includes means for yieldably maintaining the section of said filmstrip disposed between said sprocket and said idler taut, whereby the difference between the metering action of said sprocket and the filtering action of said idler and said capstan assembly on said filmstrip is accommodated.

8. The cassette of claim 9 wherein said second means additionally includes means for yieldably maintaining the section of said filmstrip disposed between said sprocket and said idler taut, whereby the difference between said metering action of said sprocket and the filtering action of said idler and said capstan assembly on said filmstrip is accommodated.

9. The cassette of claim 5 wherein said second means additionally comprises an idler rotatably mounted within said housing and over which said filmstrip passes when advanced within said housing by said first means, said filmstrip passing over said idler intermediate of said sprocket and said transducer, said housing adapted to receive a capstan assembly including a capstan and a flywheel when said cassette is mounted in said projector, said capstan adapted to press firmly against said filmstrip as said filmstrip passes over said idler, whereby said idler and said capstan assembly filter out the nonuniform motion imparted to said filmstrip by the teeth of said sprocket.

10. A film-handling cassette adapted to be alternately mounted in a motion picture camera and in a motion picture projector, said camera having drive means and means connected thereto for transporting filmstrip contained in said cassette in incremental steps in operative relationship to the lens of said camera when said cassette is mounted in said camera and said projector having drive means connected thereto for transporting filmstrip contained in said cassette in incremental steps in operative relationship to the lens of said projector when said cassette is mounted in said projector, comprising:

an enclosed opaque housing having a light-sealed section formed as part thereof and at least one aperture;

an unexposed photographic filmstrip coiled within said housing including a section adapted to serve as a soundtrack, a film exposure station within said housing external of said light-sealed section;

a sound recording and playback station within said housing external of said light-sealed section, said aperture being positioned within said sound recording and playback station;

first means adapted to being alternately connected to said camera drive means and said projector drive means for advancing said unexposed filmstrip within said housing from an initial position in said light-sealed section thereof through said exposure station and said sound recording and playback station and back into said light-sealed section, said aperture being adapted to receive at least a sound transducer of said projector in operative relationship to said soundtrack section of said filmstrip when said cassette is mounted in said projector and as said filmstrip is advanced through said sound recording and playback station;

second means for imparting a uniform speed to that section of said soundtrack passing in operative relationship to said transducer within said sound recording and playback station, said second means including an idler, rotatably mounted within said housing and over which said filmstrip passes intermediate of the position where said filmstrip is engaged by said transporting means of said projector and said sound transducer and a capstan assembly including a capstan and a flywheel, said capstan assembly rotatably mounted within said housing with said capstan pressing firmly against said filmstrip as it passes over said idler, whereby a high inertia characteristic is imparted by said capstan to said filmstrip and a normally inoperative film-processing station within said housing, intermediate the initial position of said coiled filmstrip and said sound recording and playback station, whereby said processing station may be activated to develop said filmstrip after said filmstrip has been exposed.

11. A film-handling cassette adapted to be alternatedly mounted in a motion picture camera and in a motion picture projector, said camera having drive means and means connected thereto for transporting filmstrip contained in said cassette in incremental steps in operative relationship to the lens of said camera when said cassette is mounted in said camera and said projector having drive means and means connected thereto for transporting filmstrip contained in said cassette in incremental steps in operative relationship to the lens of said projector when said cassette is mounted in said projector, comprising:

an enclosed opaque housing having a light-sealed section formed as part thereof and at least one aperture;

an unexposed photographic filmstrip coiled within said housing including a section adapted to serve as a soundtrack;

a film exposure station within said housing external of said light-sealed section;

a sound recording and playback station within said housing external of said light-sealed section, said aperture being positioned within said sound recording and playback station;

first means adapted to being alternately connected to said camera drive means and said projector drive means for advancing said unexposed filmstrip within said housing from an initial position in said light-sealed section thereof through said exposure station and said sound recording and playback station and back into said light-sealed section, said aperture being adapted to receive at least a sound transducer of said projector in operative relationship to said soundtrack section of said filmstrip when said cassette is mounted in said projector and as said filmstrip is advanced through said sound recording and playback station;

second means for imparting a uniform speed to that section of said soundtrack passing in operative relationship to said transducer within said sound recording and playback station, said second means including an idler rotatably mounted within said housing and over which said filmstrip passes when advanced within said housing by said first means, said filmstrip passing over said idler intermediate of the position where said filmstrip is engaged by said transporting means of said projector and said sound transducer, said housing adapted to receive a capstan, rotatably mounted in said projector and having a flywheel attached thereto, pressing firmly against said filmstrip as said filmstrip passes over said idler, whereby a high inertia characteristic is imparted by said capstan to said filmstrip; and a normally inoperative film-processing station within said housing, intermediate the initial position of said coiled filmstrip and said sound recording and playback station, whereby said processing station may be activated to develop said filmstrip after said filmstrip has been exposed.

12. A film-handling cassette adapted to be alternately mounted in a motion picture camera and in a motion picture projector, said camera having drive means and means connected thereto for transporting filmstrip contained in said cassette in incremental steps in operative relationship to the lens of said camera when said cassette is mounted in said camera and said projector having a rotatably mounted capstan and flywheel assembly, a sound transducer, drive means and means connected to said drive means for transporting film contained in said cassette in incremental steps in operative relationship to the lens of said projector when said cassette is mounted in said projector, comprising:

an enclosed opaque housing having a film gate and at least one aperture provided therein;

a supply reel rotatably mounted within said housing and adapted to be driven by said drive means of said projector when said cassette is mounted in said projector;

a takeup reel rotatably mounted within said housing and adapted to be driven by said drive means of said camera when said cassette is mounted in said camera and by said drive means of said projector when said cassette is mounted in said projector;

a first lighttight wall member defining a chamber in which said aperture is positioned;

a second lighttight wall member shielding the interior of said housing from light entering said film gate;

an unexposed photographic filmstrip including a section adapted to serve as a soundtrack and having its respective ends affixed to said supply reel and said takeup reel with substantially its entire length initially coiled on said supply reel and passing across said film gate and through said chamber adjacent said aperture in reaching said takeup reel, said aperture adapted to receive at least said sound transducer in operative relationship to said soundtrack section of said filmstrip when said cassette is mounted in said projector;

a sprocket engaging said filmstrip intermediate of said film gate and said chamber and adapted to be driven by at least said drive means of said projector when said cassette is mounted in said projector in unison with said film-transporting means of said projector, whereby the same length of film is metered by said sprocket towards said transducer as said film-transporting means of said projector transports in incremental steps in operative relationship to said projector lens;

an idler rotatably mounted within said chamber, said filmstrip being disposed over said idler intermediate of said sprocket and said sound transducer when said cassette is mounted in said projector and said transducer is disposed in operative relationship to said soundtrack, said cassette adapted to receive said capstan adjacent said idler pressing said filmstrip firmly against said idler, whereby nonuniform motion imparted to said filmstrip by the teeth of said sprocket is filtered out;

means for yieldably maintaining the section of said filmstrip disposed between said sprocket and said idler taut, to accommodate the difference between the nonuniform motion imparted to said filmstrip by the teeth of said sprocket and the filtering action of said idler and said assembly on said filmstrip, whereby said unexposed filmstrip may be exposed as it traverses said film gate when said cassette is mounted in said camera and sound information may be first recorded on said filmstrip as said filmstrip traverses said chamber and extracted therefrom during subsequent passes of said filmstrip through said chamber; and a normally inoperative film-processing station within said housing, said filmstrip passing therethrough between said housing, said filmstrip passing therethrough between said supply reel and said takeup reel, whereby said processing station may be activated to develop said filmstrip after said filmstrip has been exposed.

13. The cassette of claim 12, wherein said processing station includes an applicator containing processing fluid and having an orifice through which said processing fluid may be expressed onto said filmstrip.

14. A film-handling cassette adapted to be removably mounted in a motion picture camera as well as in a motion picture projector comprising:

an enclosed opaque housing having a light-sealed section formed as part thereof and at least one aperture;

an unexposed photographic filmstrip coiled within said housing including a section adapted to serve as a soundtrack;

a film exposure and projection station within said housing external of said light-sealed section;

a sound recording and playback station within said housing external of said light-sealed section, said aperture being positioned within said sound recording and playback station;

first means for advancing said filmstrip within said housing from an initial position in said light-sealed section thereof through said exposure and projection station and said sound recording and playback station and back into said light-sealed section, said aperture being adapted to receive at least a sound transducer in operative relationship to said soundtrack section of said filmstrip as said filmstrip is advanced through said sound recording and playback station; and a normally inoperative film-processing station within said housing, intermediate the initial position of said coiled filmstrip and said sound recording and playback station, whereby said processing station may be activated to develop said filmstrip after said filmstrip has been exposed.

15. A motion picture film-handling cassette comprising:

an enclosed opaque housing configured to be first mounted in a camera to facilitate film exposure operations and subsequently in a projector to facilitate film processing and viewing operations, said housing having at least one aperture;

an unexposed photographic filmstrip coiled within said housing including a section adapted to serve as a soundtrack;

a film exposure and projection station within said housing;

a sound recording and playback station within said housing, said aperture being positioned within said sound recording and playback station to receive at least a sound transducer in operative relationship with said soundtrack section of said filmstrip disposed within said sound recording and playback station;

a normally inoperative film-processing station within said housing;

means responsive to drive means of such camera and projector for advancing said filmstrip through said exposure and projection station, said sound recording and playback station and said film-processing station; and means for selectively rendering said processing station operable, whereby said filmstrip may be exposed, processed, projected and have sound information recorded thereon and extracted therefrom without being removed from said housing.

UNITED STATES PATENT OFFICE
CERTIFICATE OF CORRECTION

Patent No. 3,604,790                    Dated September 14, 1971

Inventor(s)    Edwin H. Land

It is certified that error appears in the above-identified patent and that said Letters Patent are hereby corrected as shown below:

In the Abstract, line 16, "the" (first occurrence) should be --an--
Column 1, line 38, "require" should be --requires--
Column 2, line 33, after "a" insert --projector for--
Column 3, line 14, after "and" (first occurrence) insert --a--
Column 3, line 61, after "mounting" insert --the cassette--
Column 3, line 61, delete the comma and in lieu thereof insert --. Additionally, when mounted in the projector,--
Column 4, line 9, after "thereto" insert a period
Column 6, line 67, after "Preferably," delete the comma
Column 8, line 68, "surfaces" should be --surface--
Column 9, lines 5-7, delete "inertia-imparting action of the capstan 192 on the filmstrip 52 effectively serves to filter out this small amount of"
Column 9, lines 19 & 20, delete "engages the cassette 10 is mounted in the projector 108,"
Column 9, line 21, "baffle" should be --baffled--
Column 10, line 26, delete "of" (second occurrence)
Column 12, line 1, "65" should be --64--
Column 13, line 48, "projecting" should be --projector
Column 14, line 37, the comma should be a semicolon
Column 14, line 69, after "filmstrip" insert a semicolon
Column 15, line 1, "alternatedly" should be --alternately--
Column 18, line 15, after "and" (second occurrence) indent for a paragraph Signed and sealed this 13th day of June 1972.

(SEAL)
Attest:

EDWARD M. FLETCHER, JR.
Attesting Officer

ROBERT GOTTSCHALK
Commissioner of Patents